Jan. 9, 1968     J. L. McDANIEL     3,362,657
SHORE LINE TRACKING MISSILE GUIDANCE SYSTEM
Filed May 11, 1966     9 Sheets-Sheet 2

FIG. 2

John L. McDaniel,
INVENTOR.

BY *Harry M. Saragovitz*
*Edward J. Kelly*
*Herbert Berl*
*Alfred E. Smith*

John L. McDaniel,
INVENTOR.

John L. McDaniel,
INVENTOR.

Jan. 9, 1968   J. L. McDANIEL   3,362,657
SHORE LINE TRACKING MISSILE GUIDANCE SYSTEM
Filed May 11, 1966   9 Sheets-Sheet 7

FIG. 6a

John L. McDaniel,
INVENTOR.

FIG. 6b

Jan. 9, 1968  J. L. McDANIEL  3,362,657
SHORE LINE TRACKING MISSILE GUIDANCE SYSTEM
Filed May 11, 1966  9 Sheets-Sheet 9

FIG. 6c

John L. McDaniel,
INVENTOR.

BY

United States Patent Office 3,362,657
Patented Jan. 9, 1968

3,362,657
SHORE LINE TRACKING MISSILE
GUIDANCE SYSTEM
John L. McDaniel, Huntsville, Ala., assignor to the United States of America as represented by the Secretary of the Army
Filed May 11, 1966, Ser. No. 550,095
3 Claims. (Cl. 244—3.19)

ABSTRACT OF THE DISCLOSURE

A navigation system consisting of a short-pulse radar transmitter feeding an antenna system radiating out both sides of the missile. A pair of alternately switched receiving antennas and a short-pulse radar receiver generate range pulses having a duration proportional to a missile's displacement from an appropriate river bank. These pulses are compared and an error signal generated and then applied to a control servo which maintains the missile on a desired course.

---

This invention relates, in general, to missile guidance systems and more particularly to a shore line tracking guidance system that is capable of comparing two distances and maintaining the missile at the mid-point between these distances at an appropriate altitude.

Up to the present time, there has been no missile system capable of guiding a missile flying at tree-top altitude or less up to supersonic speeds, up rivers with widths varying from one hundred feet to one or more miles or along the coast lines of oceans or large lakes. For such a system to meet military missile performance requirements, the missile must be able to negotiate sharp bends in the river or shore lines and be able to cope with reasonably sophisticated counter measures. It must be completely self-contained requiring no outside navigation aids and must also be capable of being programmed so that when the missile approaches a fork in the river, it can be guided up the desired tributary.

An object of the present invention, therefore, is to provide a missile tracking and guidance system which has the capability of guiding a low altitude high speed missile along a predetermined path such as a shore line.

Another object of the invention resides in a means for determining the mid-point between two banks of a body of water and guiding either a surface or airborne vehicle along said mid-point.

It is also an object of this invention to provide a missile with a completely self-contained guidance system of the aforementioned type.

Broadly, the objects of this invention are carried out with a system comprising a short-pulse radar transmitter feeding an antenna system which radiates from both sides of the missile. A pair of receiving antennas alternately switched, together with a short-pulse radar receiver, generate range pulses with a duration proportional to the missile's displacement from an appropriate river or lake bank. Any difference signal generated by comparing the range pulses is fed to an azimuth control servo for controlling the course of the missile.

Other objects and attendant advantages of this invention will be readily appreciated as the same becomes better understood by reference to the following detailed description when considered in connection with the accompanying drawings, wherein:

Figure 1:
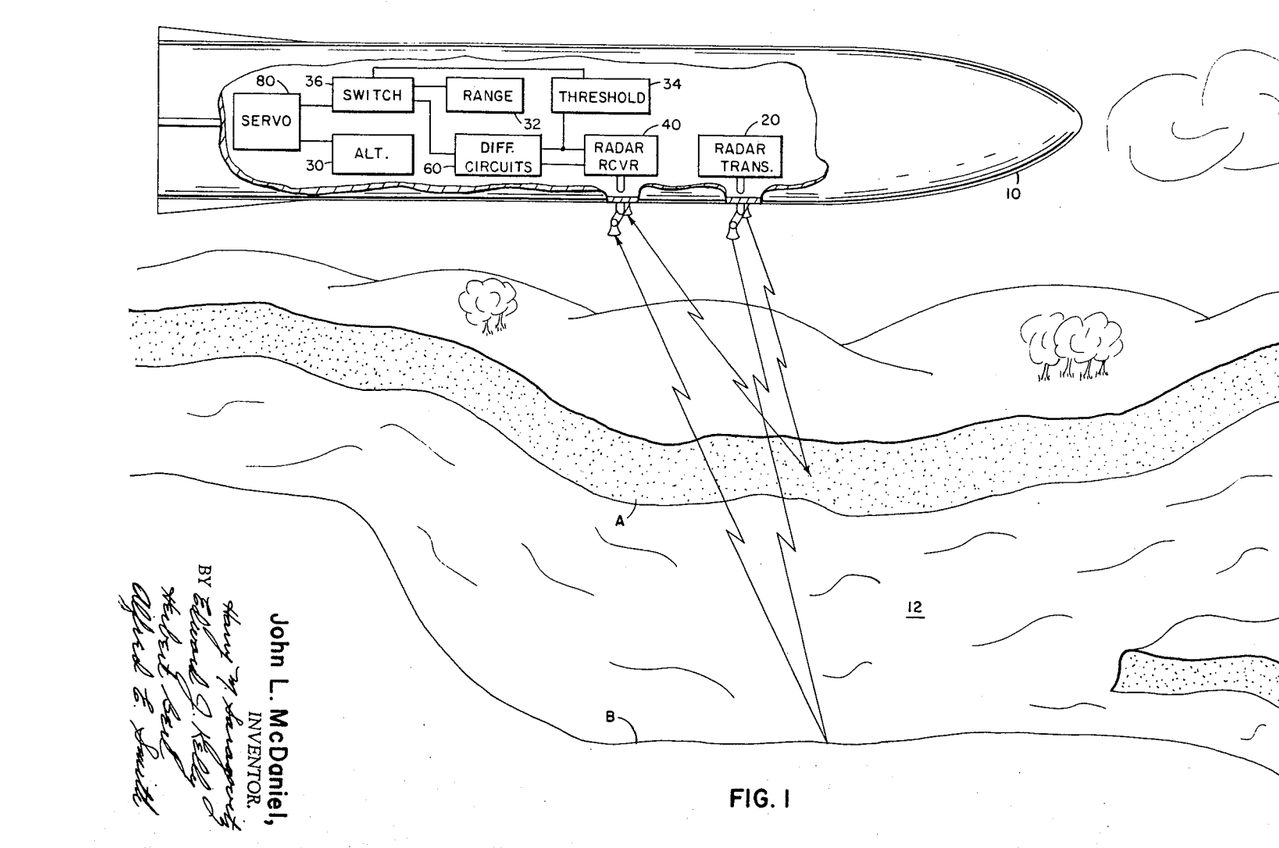
FIGURE 1 is a diagrammatic representation of a river tracking missile guidance system according to the present invention.

The inventive concept is best illustrated by reference to FIGURE 1 wherein a missile 10 is guided along river 12. Guidance of the missile is accomplished by self-contained equipment comprising a radar transmitter 20, a radar receiver 40, differencing circuits 60, an absolute altimeter 30 and a course correcting servo 80. The missile carried circuitry in effect measures the distance between river bank A and the missile and also the distance between river bank B and the missile, when either of these distances change, servo 80 is subjected to a proportional signal, and the missile direction is corrected to maintain the missile at the mid-point between banks A and B.

The altitude of the missile is maintained constant, usually less than the distance to the shore line or river bank, by servo 80 in response to signals from altimeter 30. In order to provide adequate guidance at times when the distances between river banks A and B is too great for the radar and differencing circuitry or in the absence of one bank, the system is provided with an alternative ranging circuit 32 which is capable of determining the range (distance) to one bank (or shore line). This circuit may be any conventional distance measuring device. When the output from radar receiver 40 indicates a river width greater than a predetermined value, threshold circuit 34 controls switching means 36 which disconnects the differencing circuit output from the servo and simultaneously connects the ranging circuit 32 output thereto. When the river width narrows, the difference circuitry is again effective and is reconnected to the servo.

Figure 2:
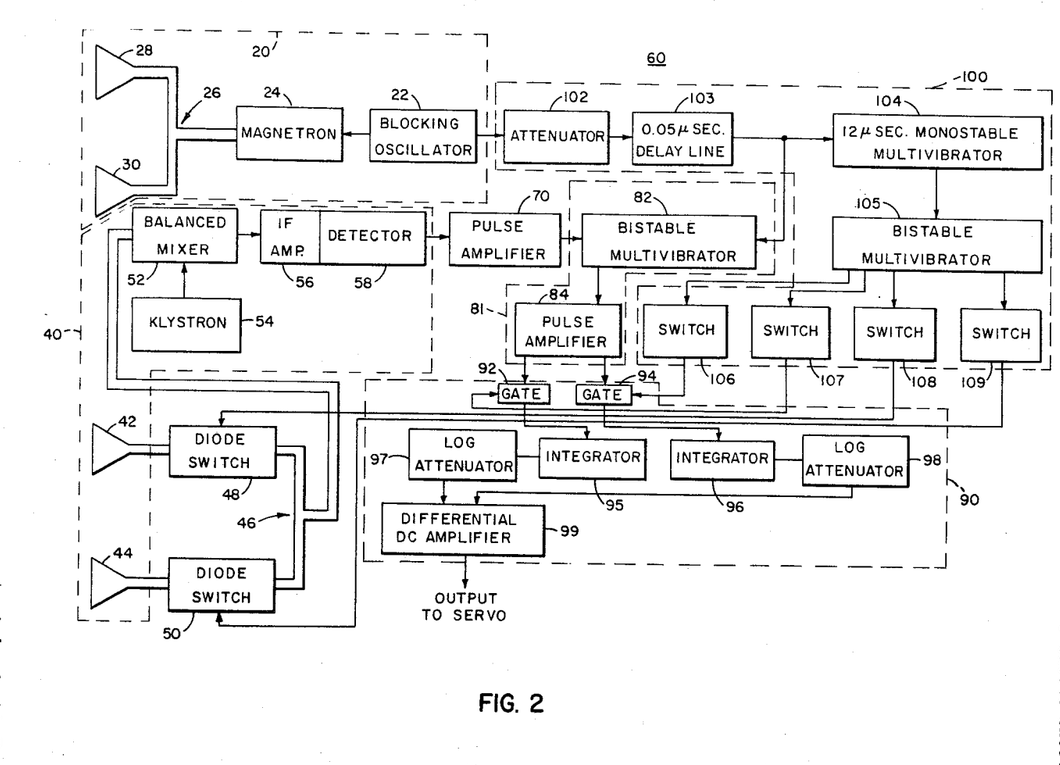
FIGURE 2 is a block diagram representation of a tracking and guidance system according to the present invention.

A specific embodiment of a system according to the present invention is illustrated in FIGURE 2 wherein short-pulse radar transmitter 20 consists of a free-running blocking oscillator 22 which produces 25 ns. pulses at a repetition rate of 40,000 per second which are applied to the cathode of an X-band pulsed magnetron 24 specifically designed for short-pulse service. The magnetron produces 25 ns. RF pulses of approximately 150 watts peak power which are waveguide coupled through a T 26 to the two horn-type antennas 28 and 30. Because of the short pulses employed, TR switches and ATR switches cannot be used, thus requiring careful mechanical placement of transmitting and receiving antennas to prevent excess spillover.

The short-pulse receiver 40 consists of two horn-type antennas 42 and 44, each terminated in a hybrid coupler 46 through two germanium diode RF switches 48 and 50. The hybrid coupler output is fed to a balanced mixer 52 which heterodynes the received echo with the local oscillator signal generated by a CW klystron 54. The mixer output, consisting of 400-megacycle pulses, is amplified by an eight-stage 400 mc. center frequency, 50 mc. bandwidth I.F. amplifier 56 and detected by a silicon diode second detector 58. Differencing circuits 60 are comprised of a video amplifier 70, a range pulse generator 81, error signal generator 90 and a channel alternating generator 100. The video amplifier consists of a three-stage transistorized pulse amplifier which standardizes the video pulses both in amplitude and pulse width.

The range pulse generator 81 consists of a bi-stable multivibrator 82 and pulses amplifier 84. The multivibrator is set by a sample of the transmitter blocking oscillator output which is attenuated and then delayed 50 ns. by a delay line in the channel alternating control generator. The bi-stable multivibrator is reset by the first echo pulse following the transmitted pulse, thus producing a pulse of length proportional to the range to the nearest target. The set-pulse is delayed by 50 ns. so that spillover from the transmitting antenna, and the resulting ringing in the IF amplifier will not falsely reset the range pulse multivibrator. The multivibrator output is amplified and standardized in amplitude by a pulse amplifier 84.

The range pulse from the range-pulse-generator pulse 84 is fed through gate circuits 92 and 94 which are alternately opened by pulses from the channel alternating multivibrator (to be described below) such that (1) gate 92 passes range pulses generated by echoes received through antenna 42, and (2) gate 94 passes only those range pulses which result from echoes received through antenna 44. The output of each gate is standardized in amplitude by a pulse amplifier and integrated by circuits 95 and 96 to produce a DC voltage that is proportional to the range to the target for that particular channel. The output of each integrator is passed through a diode log function attenuator 97 and 98 to increase the dynamic range of the system. The outputs of the two attenuators are compared in a DC differential amplifier 99 to produce an output error voltage of amplitude proportional to the log of the difference in range to the targets and a polarity indicating the sign of the position error. The channel alternating pulse generator 100 which controls gates 92 and 94 utilizes an attenuator 102 connected to blocking oscillator 22 and a delay line 103 connected to the attenuator. A sample of the attenuated and delayed transmitter-blocking-oscillator output is applied to a monostable multivibrator 104 which generates a timing pulse 12 microseconds after the transmitted pulses which is fed to a triggered bi-stable multivibrator 105. The bi-stable multivibrator output is amplified and applied to two pairs of transsistor switches 106, 107, 108 and 109. One pair of switches 108 and 109 supplies DC current alternately to the germanium diode RF switches 48 and 50, and the other pair 106 and 107 alternately opens the two range pulse gates 92 and 94.

Figure 3:
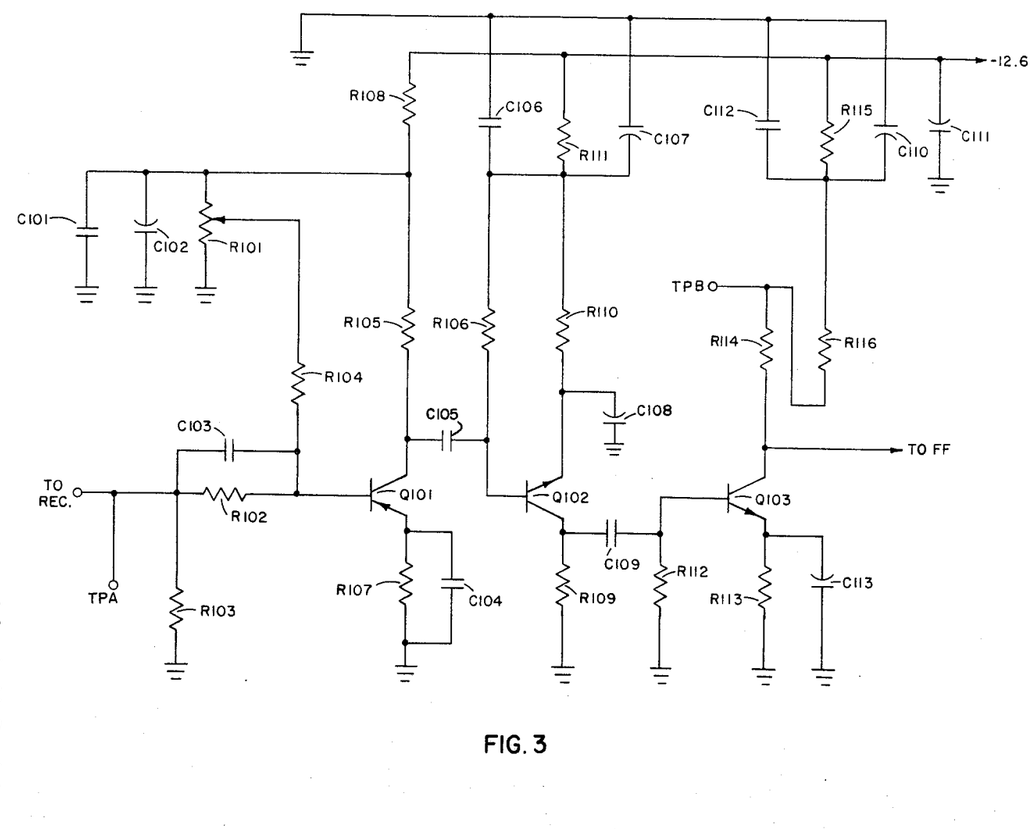
FIGURE 3 is a schematic illustration of a video amplifier usable in the system according to this invention.
Figure 4:
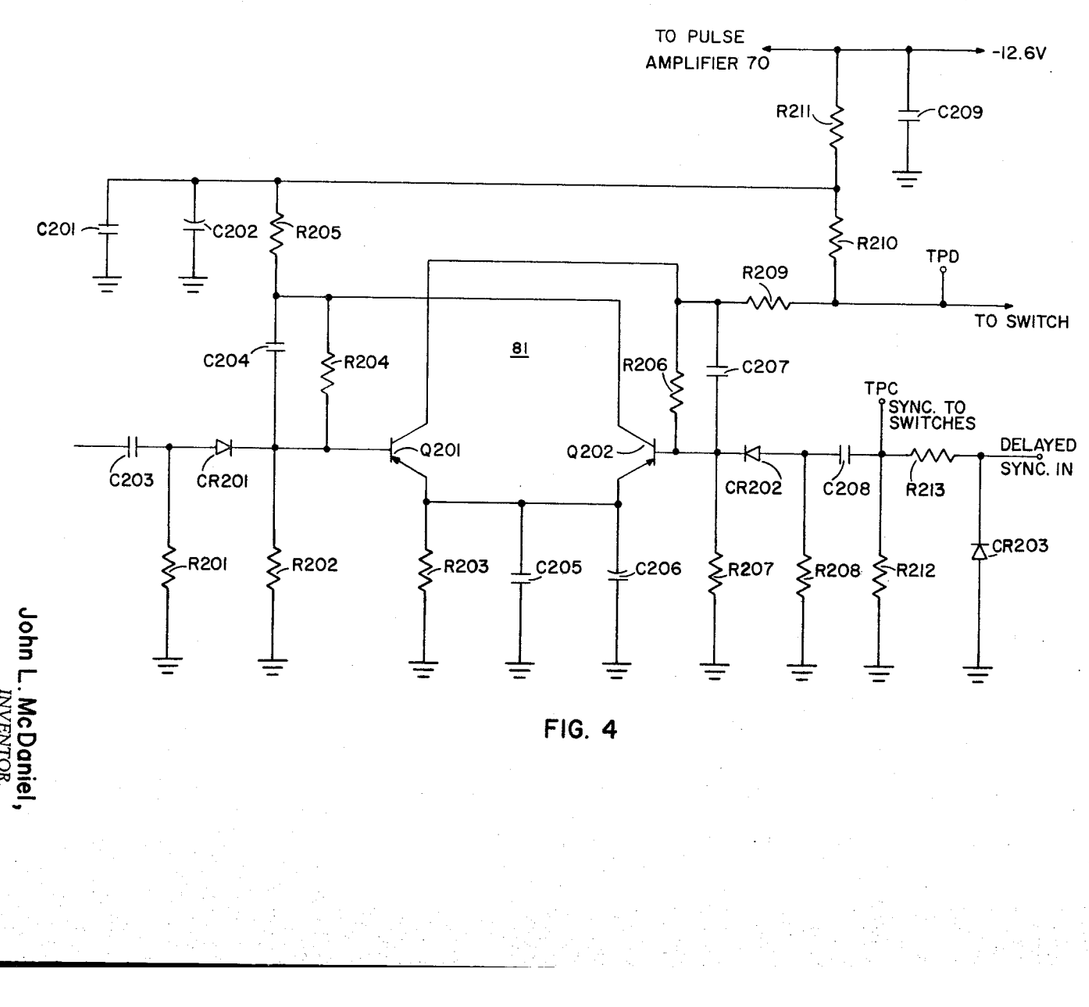
FIGURE 4 is a schematic illustration of a specific range pulse generator usable in the system of FIGURE 2.
Figure 5A:
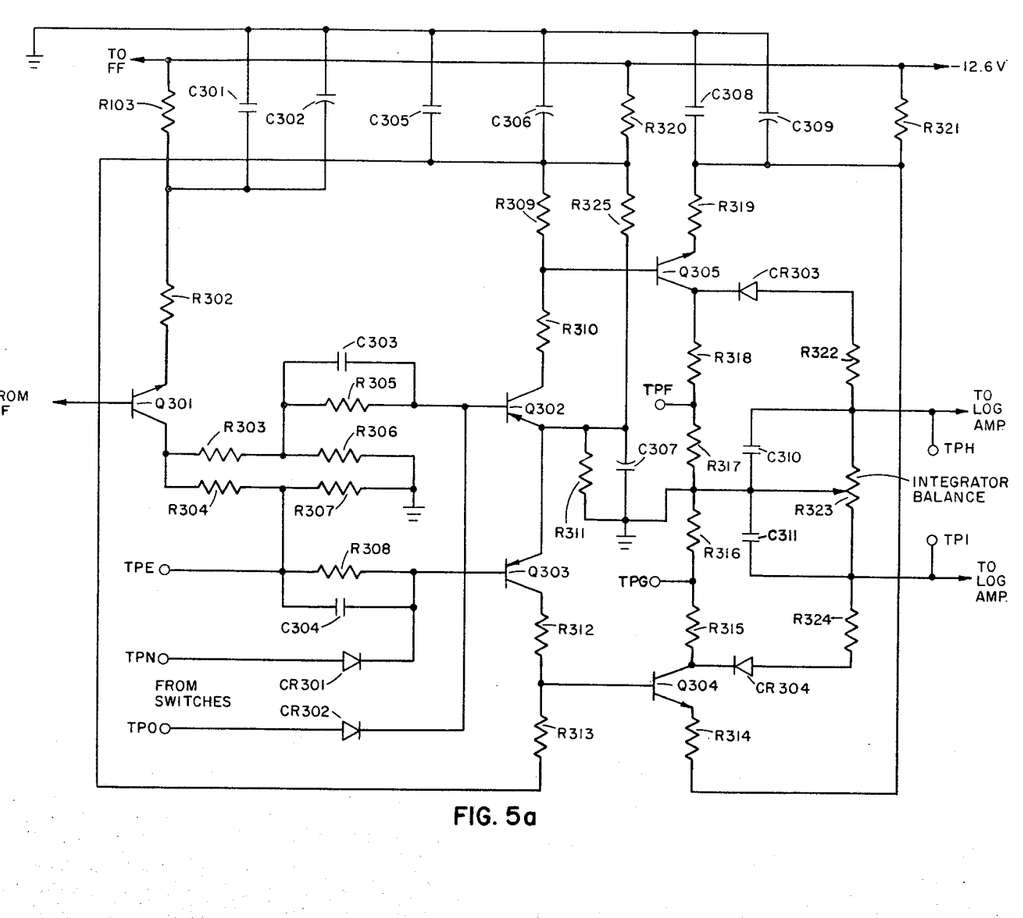
FIGURES 5a and 5b illustrate an embodiment of the error signal generator of FIGURE 2.
Figure 5B:
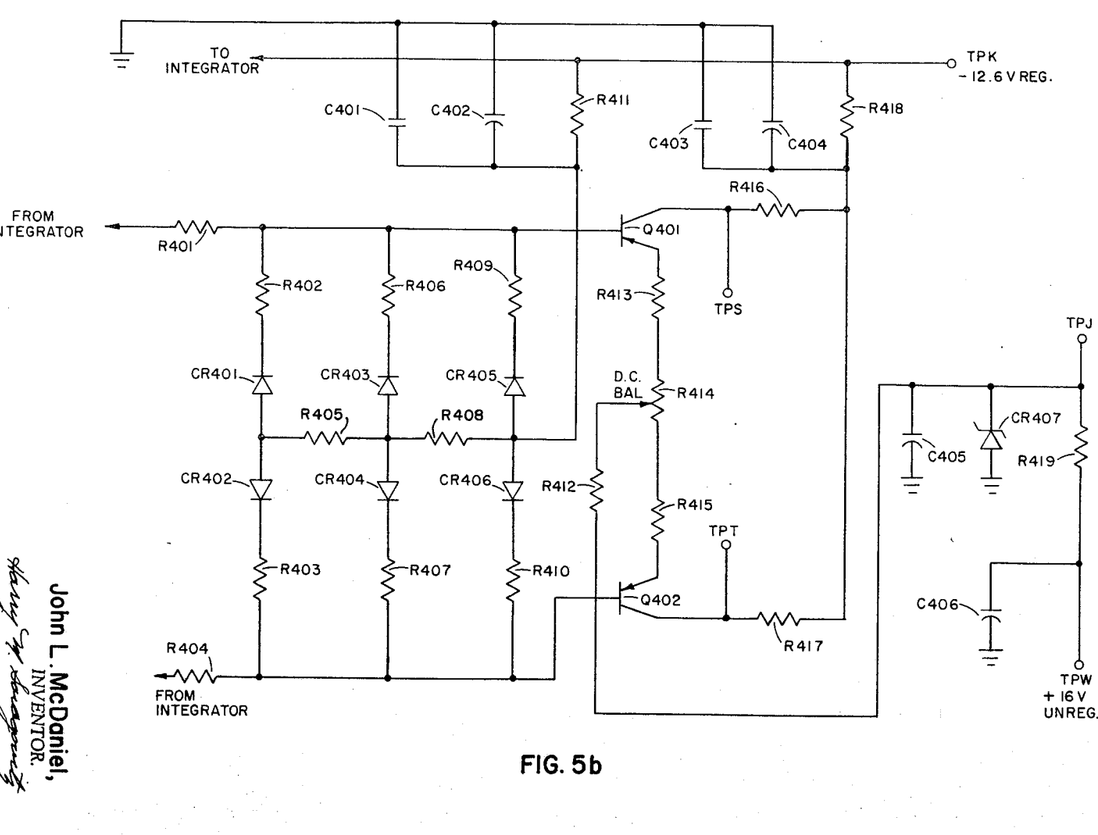

Referring now to FIGURES 3 through 5, certain basic circuits of the invention will now be described in detail. Because the radar system is a conventional item, e.g., a radar such as disclosed in an article entitled "Miniature X-Band Radar has High Resolution" in the January 30, 1959 issue of "Electronics," a detailed circuit description is not necessary.

The absolute altimeter 30 is also well known in the art, and a detailed discussion thereof is not deemed necessary.

The video amplifier illustrated in FIGURE 3 consists of three germanium transistors, Q101, Q102 and Q103. The amplifier input is obtained directly from the second detector of the IF amplifier. Resistor R103 serves as a termination for the cable connecting the video amplifier to the IF amplifier while the parallel capacitor resistor combination of C103, R102 and R104 comprises a biasing network which provides with resistor R101 an adjustable forward DC bias to transistor Q101 and allows a sensitivity adjustment. In normal operation, transistor Q101 is in a slight cutoff condition, but a very small negative pulse to the base will turn the transistor on, giving a large positive swing to the collector voltage. Resistor R105 is the collector resistor, and resistor R107 and capacitor C104 comprise the emitter network. Resistor R108 and capacitor C101 and C102 form a filtering and decoupling network. Capacitor C105 differentiates the collector voltage swing of transistor Q101 with resistor R106 controlling the time constant of this differentiating network and also serving as a DC path for the bias of transistor Q102. This differentiation greatly reduces the length of the video pulses and allows the radar to achieve the maximum theoretical range resolution permitted by the transmitted pulse length. Resistor R110 and capacitor C108 make up the emitter network for transistor Q102, and resistor R109 serves as the collector load resistance. Capacitors C106, C107 and resistor R111 decouple this stage from all others. Capacitor C109 couples the negative going collector pulse to the base of transistor Q103 while resistor R112 serves as the base DC return. Resistor R113 and capacitor C113 comprise the emitter network for transistor Q103, and resistors R114 and R116 serve as the collector load with capacitors C110, C111, C112, and resistor R115 providing decoupling. Test points TPA and TPB allow external monitoring of the video amplifier performance.

In the range pulse generator, shown in FIGURE 4, transistors Q201 and Q202 comprises a set-reset bi-stable multivibrator, and transistor Q301 is a pulse amplitude standardizing amplifier. The attenuated and delayed synchronization pulses derived from the transmitter blocking oscillator output are further attenuated by resistors R212 and R213, and any negative going portions of the pulses are clipped by diode CR203. These pulses are coupled to the set side of the bi-stable multivibrator by capacitor C208, resistor R208 and diode CR202. Video pulses are coupled to the reset side of the bi-stable multivibrator by capacitor C203, resistor R201 and diode CR201. Resistors R202 and R207 serve as base to ground paths for transistors Q201 and Q202, respectively, and C204, R204, and C207 and R206 are the cross coupling networks. The collector load resistors are R205, R209 and R210 and the common emitter network consists of R203, C205 and C206. Circuit decoupling is provided by capacitors C201, C202, C209 and resistor R211. The multivibrator output is directly coupled to the base of transistor Q301, FIGURE 5a, which has resistors R303, R304, R306 and R307 as collector resistors with R302 as the emitter resistance. Resistor R301 and capacitors C301 and C302 provide proper decoupling. Test point TPD provides an external sampling of the range pulse while test point TPC gives external synchronization pulses for oscilloscopes and other instruments.

Figure 6A:
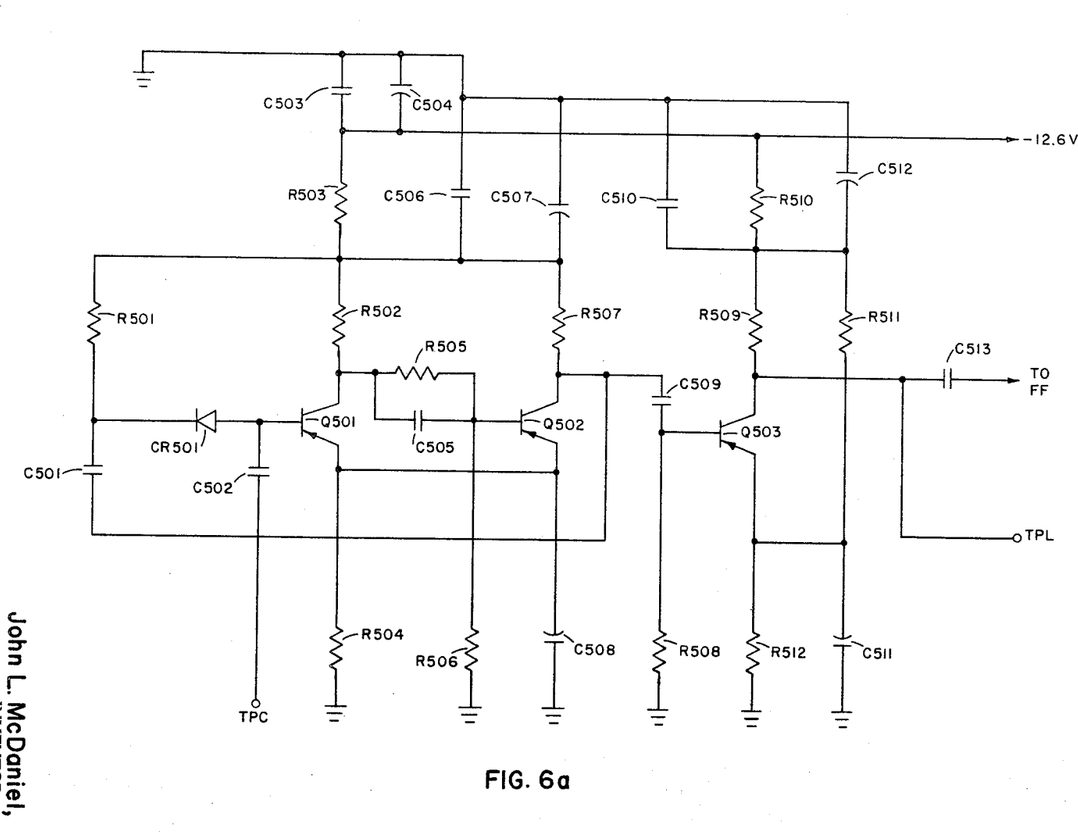
FIGURES 6a, 6b and 6c illustrate a channel alternator that may be used in the system of FIGURE 2.
Figure 6B:
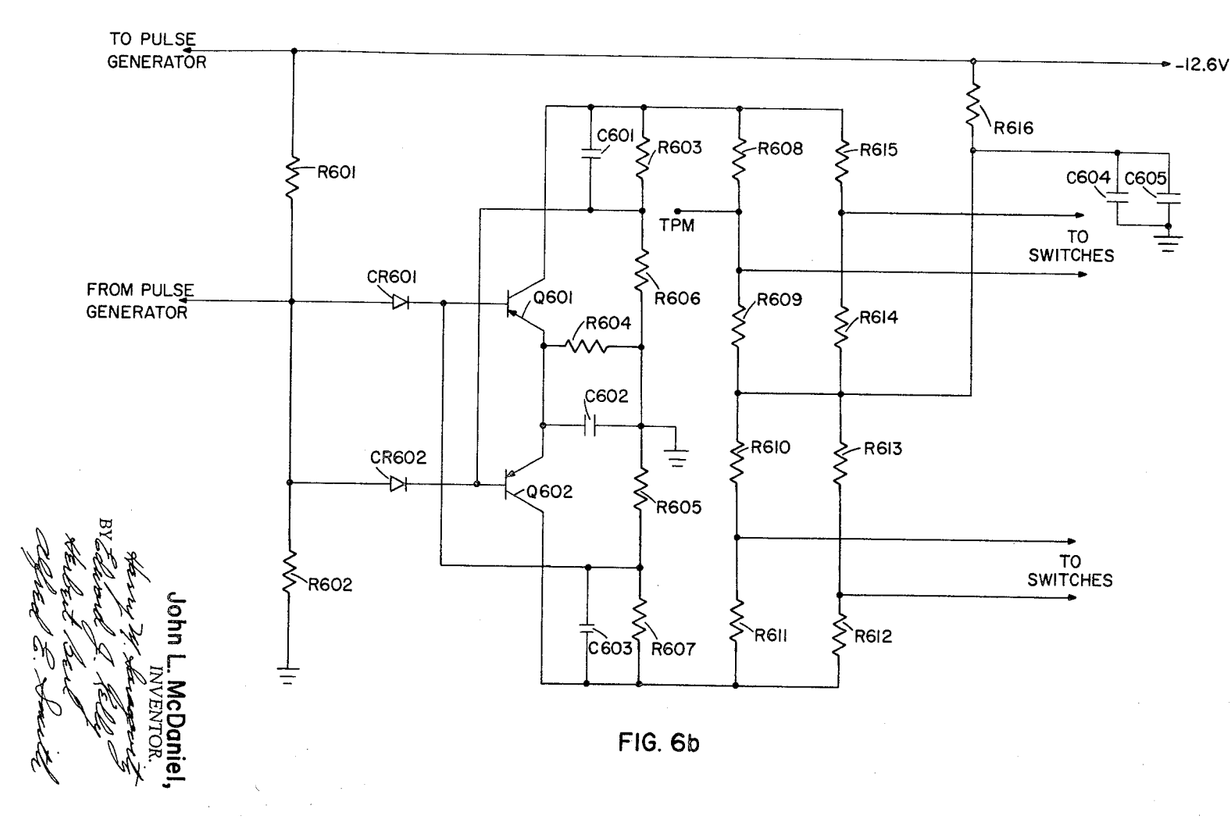
Figure 6C:
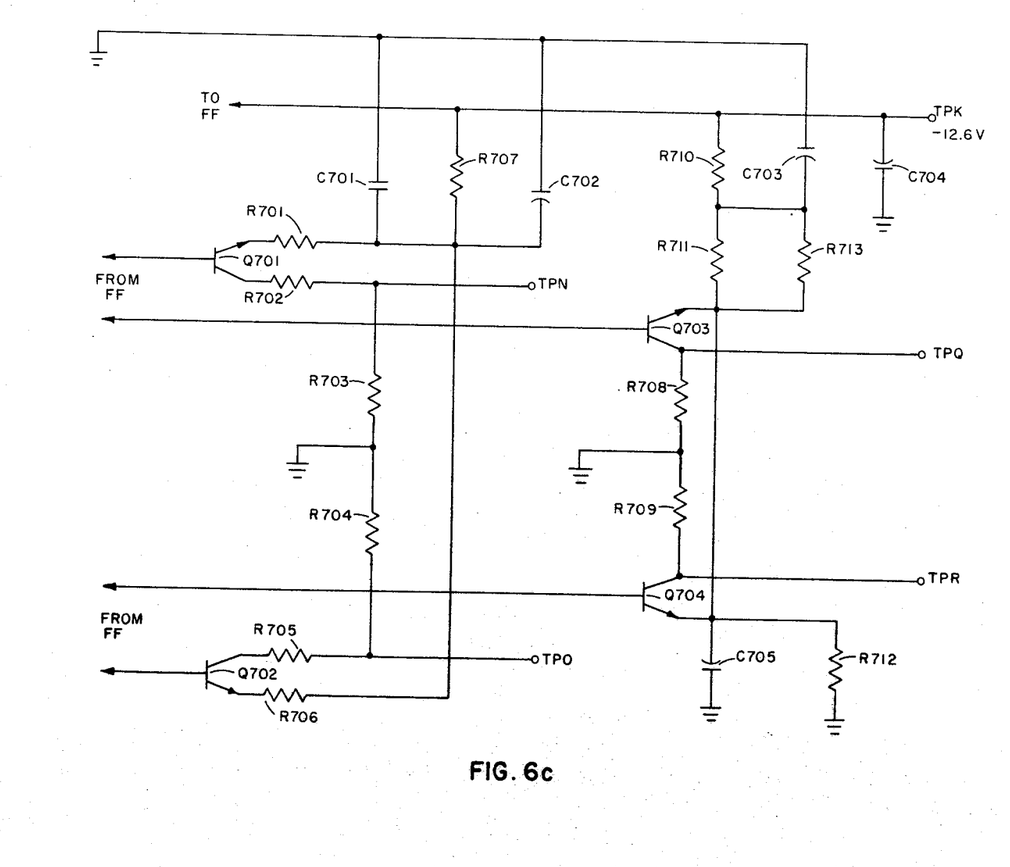

Referring now to FIGURES 5a and 5b, the error signal generator uses transistors Q302 and Q303 as range-pulse gating circuits. Transistors Q304 and Q305 form the pulse amplifier for driving the integrator which, in turn, provides DC signals to the DC amplifier transistors Q401 and Q402. The output of the range pulse amplifier 84 is coupled to the two gates 92 and 94 by networks C303, R305, and by C304, R308, and gating pulses from the channel alternating pulse generator 100 are coupled in by diodes CR301 and CR302. Resistors R309 and R310 are the collector load for transistor Q302, and resistors R312 and R313 are the collector load for transistor Q303 with resistor R311 and capacitor C307 serving as a common emitter network. The emitter to ground potential of the gate transistors is maintained by additional current through resistor R325 at a slightly higher level than that due to normal combined emitter current flowing through resistor R311. This insures reliable cutoff during inhibit pulses to the base. Capacitors C305, C306, and resistor R320 compose the decoupling network. The outputs of the gates are directly coupled to the base of transistors Q304 and Q305 which are switch-type pulse amplifiers driving the integrator network composed of diodes CR303, CR304, and capacitors C310, C311, and balancing potentiometer R323. Collector loads for these amplifiers are supplied by resistors R315 through R318, and emitter resistance is supplied by resistors R314 and R319 with decoupling provided by capacitors C308, C309 and resistor R321. The logarithmic attenuator is composed of resistors R401 through R410 and diodes CR401 through CR406 with bias and decoupling for the network supplied by resistor R411 and capacitors C401 and C402. The outputs of the two attenuator network halves are amplified and compared by transistors Q401 and Q402. The emitter network of the DC amplifier is composed of resistors R413, R415, and balancing potentiometer R414. Collector load is supplied by resistors R416 and R417 and decoupling by capacitors C403, C404 and resistor R418. Positive supply voltage for the emitter circuit of the DC amplifier is obtained from the unregulated plus 16-volt portion of the main power supply and is regulated and filtered by resistor R419, Zener diode CR407 and capacitors C405 and C406. Test points TPN and TPO allow monitoring the range gate inhibit pulses obtained from the channel alternating pulse generator, and test points TPF and TPG make possible the observation of the integrator network. Test points TPS and TPT monitor the output of the differential amplifier and also provide the output to the servo system. The inputs to the logarithmic attenuator may be sampled at test points TPH and TPI. Test points TPJ, TPK and TPW allow external checking of the positive and negative 12-volt regulated supplies and the unregulated plus 16-volt supply. An example of circuitry for the channel alternating pulse generator is illustrated in FIGURES 6a, 6b and 6c.

The pulse generator consists of a monostable multivibrator comprising transistors Q501 and Q502; a pulse amplifier transistor Q503; a bi-stable multivibrator formed by transistors Q601 and Q602; range-pulse-gate inhibit switches comprising transistors Q701 and Q702; and RF diode switch driving transistors Q703 and Q704. Alternated and delayed synchronization pulses from the transmitting blocking oscillator are coupled to the base of transistor Q501 by capacitor C502 after entering the circuit of test point TPC. Resistor R504 and capacitor C508 make up the common emitter network for transistors Q501 and Q502 while resistor R505 and capacitor C505 form the cross coupling network. Resistor R506 is the base to ground DC path to transistor Q502 with resistors R502 and R507 serving as collector load resistors for transistors Q501 and Q502, respectively. Resistor R501 and capacitor C501 comprise the network which determines the length of the pulses generated by the multivibrator with diode CR501 isolating this network from the base circuit from transistor Q501 to prevent changes in base characteristics from affecting the pulse length. Capacitors C503, C504, C506, C507 and resistor R503 form the circuits' decoupling network. Capacitor C509 and resistor R508 differentiate the output of the multivibrator, and the resulting negative going spike is amplified by transistor Q503. Resistor R512 and capacitor C511 make up the emitter network with resistor R511 providing additional emitter to ground potential to insure cutoff except when a spike from the differentiator is impressed on the base.

Resistor R509 is the collector load resistor, and capacitors C510, C512 with resistor R510 form a decoupling network. Test point TPL allows external monitoring of the resulting delayed synchronization pulse. Capacitor C513 couples the amplified pulse to the triggered bi-stable multivibrator through a coupling network formed by resistors R601, R602 and diodes CR601 and CR602. The emitter network for transistors Q601 and Q602 is formed by resistor R604 and capacitor C602, while resistors R608 through R615 are the collector load resistances. The cross coupling networks are made up of capacitor C601 in parallel with resistor R603, and capacitor C603 in parallel with R607, circuit decoupling is provided by resistor R616 and capacitors C604 and C605. The multivibrator output is directly coupled to the bases of transistors Q701 through Q704. Resistors R701 and R706 form the emitter networks for transistors Q701 and Q702 with resistors R702 through R705 serving as collector loads. Capacitors C701, C702 and resistor R701 are decoupling components. Resistors R711 through R713 and capacitor C705 form an emitter network for transistors Q703 and Q704 with resistors R708 and R709 as collector resistors and capacitors C703, C704 and resistor R710 supplying proper decoupling. Test points TPN, TPO, TPQ and TPR allow external checking of circuit performance and serve as tie points for cabling to other circuits.

The present invention has been described with reference to a specific embodiment of a system for accomplishing the stated objects. Although the invention has been described in detail as a guidance system for missiles, the system could also be used for guiding a boat up a river or along a coast line. Obviously, various changes and modifications may be made in the disclosed system without departing from the scope of my invention as defined in the appended claims.

I claim:

1. A short line tracking guidance system comprising: a vehicle for traveling a desired path; a radar system carried by said vehicle and including first and second transmitter and receiver means for measuring the distances between said vehicle and both banks of a river; a differencing circuit connected to said radar system and providing an output signal related to the difference between said distances; a servo system connected to said differencing circuit and responsive to said output signal for maintaining said vehicle on said desired path; means for generating a control voltage proportional to the distance from said missile to one of said river banks and means disconnecting said differencing circuit output from said servo and connecting said control voltage to said servo when said river exceeds a predetermined width whereby said missile is maintained a fixed distance from said bank until the river width is again reduced to a value below said predetermined width.

2. A shore line tracking guidance system as set forth in claim 1 and further including an absolute altimeter connected to said servo system for maintaining the altitude of said missile constant.

3. A missile guidance system for producing a guidance signal for a missile following a path defined by a river or the like, said system comprising: a radar transmitter including an oscillator and first and second transmitting antennas disposed for radiating energy from opposite sides of the missile and directed toward the banks of said river; a radar receiver including first and second receiving antennas disposed on opposite sides of the missile; a multivibrator connected to said oscillator and said receiver for providing range pulses having a duration proportional to the distance to said river banks; an error signal generating means responsive to the output of said multivibrator for providing first and second error signals related to the distance to said river banks; a channel alternating generator means for providing control signals to said error signal means and said receiving antennas whereby said first and second error signals are related to first and second river banks respectively; a differential amplifier connected to said error signal means for providing an output error signal having an amplitude related to the difference in range to the two river banks and a polarity indicating the sign of the position error; and a control servo connected to said amplifier for controlling the course of the missile.

References Cited

UNITED STATES PATENTS

| | | | |
|---|---|---|---|
| 2,176,469 | 10/1939 | Moueix | 343—7 |
| 2,421,018 | 5/1947 | De Rosa | 343—7 |
| 2,421,248 | 5/1947 | De Forest | 343—7 |
| 2,421,663 | 6/1947 | Tolson | 244—3.19 |
| 2,424,193 | 7/1947 | Rost et al. | 244—3.19 |
| 3,141,161 | 7/1964 | King | 343—7 |
| 3,181,153 | 4/1965 | R. T. Cella | 343—12 |
| 3,255,984 | 6/1966 | Hawes | 244—3.13 |

BENJAMIN A. BORCHELT, *Primary Examiner.*

T. H. WEBB, *Assistant Examiner.*